United States Patent [19]

Henton

[11] 4,367,310

[45] Jan. 4, 1983

[54] BLENDS OF POLYCARBONATE WITH RUBBER AND MONOVINYLIDENE AROMATIC COPOLYMERS

[75] Inventor: David E. Henton, Midland, Mich.

[73] Assignee: The Dow Chemical Company, Midland, Mich.

[21] Appl. No.: 149,821

[22] Filed: May 15, 1980

Related U.S. Application Data

[63] Continuation-in-part of Ser. No. 35,584, May 3, 1979, Pat. No. 4,218,544.

[51] Int. Cl.$^3$ .......................... C08L 69/00; C08L 9/00
[52] U.S. Cl. ........................................ 525/67; 525/92; 525/93; 525/146; 525/148
[58] Field of Search .................... 525/146, 148, 67, 69, 525/92, 93

[56] References Cited

U.S. PATENT DOCUMENTS 3,862,998  1/1975  Koehler et al. ................... 260/873
3,873,641  3/1975  Margotte et al. .................. 260/873
4,218,544  8/1980  Henton .............................. 260/873

*Primary Examiner*—John Kight, III
*Assistant Examiner*—Amelia B. Yarbrough

[57] ABSTRACT

Blends of polycarbonate, such as a polycarbonate of bisphenol-A, with (1) a grafted and nongrafted rubber, such as a diene rubber and a diene rubber grafted with a polar polymer, (2) a monovinylidene aromatic/carboxylic anhydride copolymer, such as styrene/maleic anhydride copolymer, and (3) a compatible polymer, such as styrene/acrylonitrile copolymer, exhibit improved impact strength, melt flow properties and heat resistance. Such blends are particularly useful in the manufacture of molded parts which must be exposed to high temperature during manufacture and use.

An example of a particularly desirable blend is a blend of a homopolycarbonate of bisphenol-A with styrene/maleic anhydride copolymer and an ABS resin containing grafted and nongrafted butadiene rubber and styrene/acrylonitrile random copolymer.

6 Claims, No Drawings

BLENDS OF POLYCARBONATE WITH RUBBER AND MONOVINYLIDENE AROMATIC COPOLYMERS

CROSS-REFERENCE TO RELATED APPLICATION

This application is a continuation-in-part of our previously filed application Ser. No. 035,584 which was filed May 3, 1979, now U.S. Pat. No. 4,218,544, issued Aug. 19, 1980.

BACKGROUND OF THE INVENTION

This invention relates to blends of an aromatic polycarbonate with a rubber, a monovinylidene aromatic copolymer and a polar polymer.

The polycarbonates of dihydric phenol such as bisphenol-A, which are described in U.S. Pat. No. 3,028,365, are known to be useful in the manufacture of molded plastic parts. Such resins are notably tough and have moderately high softening temperatures. Unfortunately, however, as a result of their relatively poor melt flow characteristics, such polymers are generally more difficult to mold than is often desirable. Also, such aromatic polycarbontes are relatively expensive materials.

Previous attempts to improve melt flow characteristics of these aromatic polycarbonates have generally involved incorporating a lower melting, less expensive polymer into the polycarbonate. See, for example, U.S. Pat. Nos. 3,130,177; 3,239,582; 3,966,842 and 3,862,998. The blends resulting from such attempts generally exhibit improved melt flow properties at the sacrifice of other desirable features such as heat resistance, impact strength and the like.

In view of the deficiencies of conventional polycarbontes and blends thereof, it would be highly desirable to provide an economical polycarbonate composition which exhibits improved processability while retaining most of the physical properties characteristic of the original polycarbonate.

SUMMARY OF THE INVENTION

The present invention is such a desirable polycarbonate composition. This composition is a heterogeneous blend comprising at least one polycarbonate of a dihydric phenol blended with a rubber component and at least one copolymer of a monovinylidene aromatic monomer and an α,β-ethylenically unsaturated carboxylic anhydride (hereinafter called an anhydride copolymer) and at least one polymer of a polar ethylenically unsaturated monomer other than an anhydride (hereinafter called compatible polymer). The compatible polymer functions to improve the flow rate of the blend under the shear conditions which are characteristic of the fabrication of polycarbonate blends without reducing the Gardner Dart impact strength of the blend to a value below about 100 inch-pounds as determined by the test method described hereinafter. In addition, at least a portion of the rubber component is a graft copolymer of a rubber polymer which is grafted with at least a portion of either the anhydride copolymer or the compatible polymer or both. Also for the purposes of this invention, a block copolymer of a rubber polymer which is blocked with a portion of the anhydride copolymer, the compatible polymer or both is a suitable substitute for said graft copolymer. Herein, the term "rubber component" shall be generic to include all rubber in the blend in grafted or blocked as well as nongrafted/nonblocked form. Similarly, the terms "anhydride copolymer" and "compatible polymer" shall include both nongrafted/nonblocked and grafted/blocked portions of said polymers.

The components of the aforementioned blend are employed in proportions sufficient to provide the blend with the following properties: (1) a Gardner Dart impact strength of at least about 100 inch-pounds, (2) a notched Izod impact strength of at least 3 foot-pounds/inch of notch, (3) a heat resistance of at least about 225° F. and (4) a processability (injection pressure) of less than about 7500 pounds per square inch (psi) at a mold fill time of 2.2 seconds wherein said properties are determined in accordance with the test methods described hereinafter. Surprisingly, by incorporating the compatible polymer into the blend, significantly greater processability is achieved without unacceptable loss of other physical properties such as impact strength and heat resistance.

The polycarbonate blends of this invention are suitably employed in most applications in which polycarbonates and various rubber modified polymers have previously been utilized. Applictions of particular interest for these polycarbonate blends are housings for electrical appliances, radio and television cabinets, automotive equipment including ornaments, and business machine housings and the like.

DETAILED DESCRIPTION OF ILLUSTRATIVE EMBODIMENTS

The polycarbonate compositions of the present invention are heterogeneous blends wherein the polycarbonate and the remaining components, rubber, anhydride copolymer and compatible polymer, exist as at least three separate and distinct phases, i.e., a polycarbonate phase, a rubber phase and an anhydride copolymer phase, with the rubber phase always being a disperse phase. So long as the proportions of the blend components are sufficient to provide the blend with the properties set forth hereinbefore, such proportions are not particularly critical. Advantageously, however, the blend comprises from about 20 to about 85, preferably from about 25 to about 80, more preferably from about 35 to about 70, most preferably from about 40 to about 60, weight percent of the polycarbonate; from about 5 to about 25, preferably from about 6 to about 20, weight percent of rubber; from about 1 to about 69, preferably from about 10 to about 62, more preferably from about 15 to about 55, weight percent of anhydride copolymer; and from about 1 to about 69, preferably from about 2 to about 50, most preferably from 4 to about 44, weight percent of the compatible polymer. All of said percentages are based on the weight of the blend.

The blend of the present invention is a readily processable, normally solid thermoplastic material. By "readily processable" is meant that the blend exhibits an injection pressure of less than about 7500 psi, preferably less than about 6600 psi, most preferably from about 5000 to about 6500 psi, at a mold fill time of 2.2 seconds wherein injection pressure is determined according to the test method described hereinafter in Table I. In addition, the blend exhibits heat and impact resistances which are unexpectedly high in view of the heat and impact resistances of the components of the blend. For example, the blend exhibits (1) a Gardner Dart impact resistance which is at least about 100, preferably greater than 160, most preferably greater than 320, inch-pounds (in-lbs); (2) a notch Izod impact resistance as determined by ASTM D-256 which is at least 3, preferably greater than 4, most preferably greater than 5, footpounds per inch of notch (ft-lbs/in); and (3) a heat resistance as determined by ASTM D-648 (66 psi unannealed) greater than about 225° F., preferably greater than 240° F., most preferably from about 245° F. to about 270° F. In some applications, the most preferred blend optionally exhibits, if desired, gloss values at an angle of 60° as determined by ASTM D-523 which are greater than 85%.

The polycarbonates employed in the blends of this invention suitably contain, and preferably consist essentially of, residues of aromatic diols such as the dihydric phenols represented by the formula:

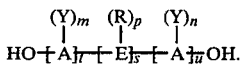

$$\text{HO}\!\!-\!\!(\text{A})_{t}\!\!-\!\!(\text{E})_{s}\!\!-\!\!(\text{A})_{u}\!\text{OH}. \qquad \text{II}$$

with substituents $(Y)_m$, $(R)_p$, $(Y)_n$.

wherein each A is individually an aromatic group such as phenylene, biphenylene, naphthylene, anthrylene and the like; E is alkylene or alkylidene such as methylene, ethylene, ethylidene, propylene, propylidene, isopropylidene, butylene, butylidene, isobutylidene, amylidene or E may be cycloalkylene such as cyclopentylene or cyclohexylene, a sulfur containing linkage such as sulfide, sulfoxide or sulfone, an ether linkage, a carbonyl group, a tertiary nitrogen group, or the like; each R is individually hydrogen or a monovalent hydrocarbon group such as alkyl, aryl, arylalkyl, or cycloaliphatic; each Y is individually chlorine, bromine, fluorine or R wherein R is defined as above; m and n are any whole numbers from and including 0 through the number of positions on A available for substitution; p is any whole number and including 0 through the number of positions available on E; t is any whole number which is 1 or more; s is 0 or 1 and u is any whole number including 0.

Examples of such dihydric phenols include the bis(-hydroxyphenyl)alkylidenes such as 2,2-bis-(4-hydroxyphenyl)propane [bisphenol A]; 2,4'-dihydroxydiphenylmethane; bis-(2-hydroxyphenyl)methane; 1,1-bis(4-hydroxyphenyl)ethane and other bisphenol-A type diols as described in U.S. Pat. No. 3,028,365 as well as the corresponding aromatically substituted or aliphatically substituted dihydric phenols wherein the substituents are halogens such as Cl, F, Br, I, —NO$_2$, —O—, alkyl, acyl, carboxylate ester, sulfonate ester and the like. Of the foregoing dihydric phenols, bisphenol-A and substituted bisphenol-A are preferred, with bisphenol-A being most preferred.

While not critical, the molecular weight ($M_w$) of said polycarbonate is preferably in the range from about 10,000 to about 65,000, more preferably from about 20,000 to about 40,000, and most preferably from about 28,000 to about 33,000. Preferably, such polycarbonates are prepared by a conventional technique involving the reaction of one of the aforementioned diols or a mixture of such diols with a carbonyl halide such as phosgene in an organic solution containing a base such as pyridine. Suitable methods for preparing such polycarbonates are further described in U.S. Pat. No. 3,028,365.

The rubber polymers useful as the rubber portion of the rubber component are, for example, polyurethane rubber, ethylene/vinylacetate rubber, silicone rubber, polyether rubber, polyalkenamer rubber, ethylene-propylene-diene rubber, acrylate rubbers such as butyl acrylate rubbers described in U.S. Pat. No. 3,502,604, and the so-called diene rubbers, i.e., homopolymers of conjugated dienes which contain from 4 to 8 carbon atoms such as butadiene, isoprene, piperylene and chloroprene, copolymes of such dienes with each other and copolymers of such dienes with one or more other monomers such as styrene, acrylic or methacrylic compounds such as acrylonitrile, methacrylonitrile, acrylic acid, methacrylic acid, butyl acrylate, methyl methacrylate, or isobutylene. Preferred rubber polymers are the diene rubbers, particularly polybutadiene and copolymers of butadiene with styrene and/or acrylonitrile. As stated hereinbefore, the term "rubber component" as used in the definition of the blends of this invention requires that at least a portion of the aforementioned rubber polymer be grafted with random anhydride copolymer or nongrafted compatible polymer, the latter two polymers being described in more detail hereinafter. In general, the portion of grafted rubber polymer is sufficient to provide increased impact strength (Gardner Dart or notched Izod) as compared to a blend which is similar in all respects except that it contains no grafted rubber polymer. The aforementioned rubber polymers suitably provide the rubber substrate of the grafted rubber polymer as well as satisfactorily perform as the nongrafted rubber when such is present. Of particular interest as rubber polymers are diene rubbers or butyl acrylate rubbers.

In the preferred diene rubber polymers, the amount of diene is sufficient to provide the desired elastomeric character. An especially preferred group of diene rubbers is one containing from about 50 to about 100 weight percent of butadiene and/or isoprene in polymerized or copolymerized form and up to about 50 weight percent of monovinylidene aromatic hydrocarbon such as styrene and/or an unsaturated nitrile such as acrylonitrile in polymerized or copolymerized form. Particularly advantageous are the homopolymers of butadiene and the copolymers of butadiene with up to 50 weight percent of styrene and/or acrylonitrile.

The preferred rubber polymers exhibit glass transition temperatures ($T_g$) generally less than 0° C., most preferably less than −30° C. as determined by differential scanning calorimetry. In the blend of this invention, the rubber polymer advantageously has an average particle size of about 10 micrometers or less, preferably in the range from about 0.05 to about 5 micrometers. The molecular weight of the rubber polymer is not particularly critical so long as the rubber polymer is a reinforcing rubber. Advantageously, the rubber polymer, when in the form of the aforementioned rubber component, is capable of reinforcing the random anhydride copolymer as determined by the Gardner Dart impact resistance test, i.e., a dispersion of the rubber component in the random anhydride copolymer will exhibit a Gardner Dart impact resistance greater than that of the random anhydride copolymer.

In addition to the aforementioned monomeric components, it should be understood that the rubber polymer may also contain relatively small amounts, usually less than about 2 weight percent based on the rubber, of a crosslinking agent such as divinylbenzene, diallylmaleate, ethylene glycol dimethacrylate and the like, provided that such crosslinking does not eliminate the desired elastomeric character of the rubber polymer. The rubber polymer is readily prepared by known methods of radical polymerization, e.g., by bulk polymerization or polymerization in solution, suspension or emulsion or by combined process such as precipitation and bulk/suspension processes. Polymerization processes carried out with the aid of organometallic mixed catalysts such as Ziegler type catalysts are also suitably employed in the preparation of the rubber polymer.

The anhydride copolymer employed in the blend of this invention suitably comprises any normally solid random copolymer of at least one monovinylidene aromatic monomer and at least one copolymerizable ethylenically unsaturated carboxylic anhydride. The amount of the anhydride comonomer in this random copolymer is such that the solubility parameter of this random copolymer is from about 9.2 to about 10.5, preferably from about 9.3 to about 10. Preferably, this random copolymer contains polymerized therein from about 50 to about 95, more preferably from about 65 to about 90, weight percent of the monovinylidene aromatic monomer, which is preferably styrene, and from about 50 to about 5, more preferably from about 35 to about 10, weight percent of the anhydride comonomer which is preferably an α,β-ethylenically unsaturated carboxylic anhydride, especially maleic anhydride. Other suitable anhydrides include the anhydrides of α,β-ethylenically unsaturated dicarboxylic acids such as chloromaleic, citraconic, aconitic, itaconic, phenylmaleic as well as mixtures of the aforementioned anhydrides. Other suitable monovinylidene aromatic monomers include t-butylstyrene, α-methylstyrene, p-bromostyrene, α-chlorostyrene, p-chlorostyrene, 2,4-dichlorostyrene, p-methylstyrene, 3,4-dimethylstyrene and mixtures thereof. Other copolymerizable monomers can be employed in the random anhydride copolymer. Advantageously, the random anhydride copolymer contains significantly less than 5 weight percent of α,β-ethylenically unsaturated nitrile. Preferably, the random anhydride copolymer consists essentially of monovinylidene aromatic and anhydride monomers. Molecular weight of the anhydride copolymer should be sufficient to enable the blend to have a Gardner Dart impact strength of at least 100 in-lbs. The random anhydride copolymer preferably has a weight average molecular weight ($M_w$) as determined by gel permeation chromatography (GPC based on a polystyrene standard) in the range from about 100,000 to about 400,000, most preferably from about 150,000 to about 300,000.

In instances wherein a portion of the random anhydride copolymer is to be grafted upon a portion of the aforementioned rubber polymer, the combination of the nongrafted random copolymer and the graft copolymer of rubber polymer and the random anhydride copolymer is referred to as an anhydride resin. In such anhydride resins, the graft copolymer of rubber polymer and random anhydride copolymer is present in an amount sufficient to provide the resin with a Gardner Dart impact resistance of at least 100 in-lbs, preferably at least 160 in-lbs.

The random anhydride copolymer is readily prepared by known methods of radical polymerization, e.g., by bulk polymerization, solution polymerization, etc. Examples of such copolymers and methods for their preparation are disclosed in U.S. Pat. Nos. 3,725,360; 3,401,153; 2,971,939; 2,769,804 and 3,336,267. When anhydride resin is to be employed in the blend, the anhydride resin is prepared by known procedures. Examples of such resins and methods for their preparation are described in U.S. Pat. Nos. 3,642,949; 3,641,212; 3,919,354 and 3,966,842. All of the foregoing references are hereby incorporated by reference in their entirety.

The compatible polymer advantageously contains a normally solid nonelastomeric nongrafted polymer (herein called nongrafted compatible polymer) of at least one ethylenically unsaturated polar monomer other than an ethylenically unsaturated anhydride (as defined hereinbefore). The polymer is considered compatible for the purposes of this invention if it, when blended with random anhydride copolymer, displaces the glass transition temperature ($T_g$) of the random anhydride copolymer. Preferably, a blend of the nongrafted compatible polymer and the random anhydride copolymer exhibits a single $T_g$. $T_g$ is advantageously measured using a differential scanning calorimeter. The nongrafted compatible polymer thereof has a solubility parameter in the range from about 8.5 to about 10.5, preferably from about 9.0 to 10.2.

For the purposes of this invention, a polar monomer is a polymerizable ethylenically unsaturated compound bearing a polar group having a group moment in the range from about 1.4 to about 4.4 Debye units as determined by Smyth, C.P., *Dielectric Behavior and Structure*, McGraw-Hill Book Company, Inc., New York (1955). Exemplary polar groups include —CN, —NO₂, —CO₂H, —OH,

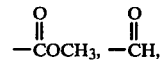

—Br, —Cl, —NH₂ and —OCH₃. Preferably, the polar monomer is an ethylenically unsaturated nitrile such as acrylonitrile, methacrylonitrile and fumaronitrile, with acrylonitrile being especially preferred. Other polar monomers include alkyl esters of α,β-ethylenically unsaturated acids, e.g., alkyl acrylates and methacrylates, methyl acrylate, butyl acrylate and methyl methacrylate; ethylenically unsaturated carboxylic acids such as acrylic acid, methacrylic acid and itaconic acid and the like. Preferred nongrafted compatible polymers are copolymers of monovinylidene aromatic monomers as defined hereinbefore and at least one polar monomer, especially acrylonitrile and/or methyl methacrylate. Most preferred are styrene/acrylonitrile copolymers containing from about 5 to about 85 mole percent of styrene, from about 10 to about 95 mole percent of acrylonitrile and from 0 to 85 mole percent of another preferred polar monomer such as methyl methacrylate. The molecular weight of the nongrafted compatible copolymer is not particularly critical so long as the compatible copolymer can be melt blended with the other components of the blend. Preferably, however, the nongrafted compatible polymer has a weight average molecular weight ($M_w$) as determined by gel permeation chromatography in the range from about 40,000 to about 300,000, preferably from about 60,000 to about 300,000.

As with the anhydride copolymer, the compatible copolymer can contain, in addition to the nongrafted compatible polymer, a graft copolymer of the nongrafted compatible polymer on a rubber polymer (defined hereinbefore). In such instances, the combination of nongrafted compatible polymer and graft copolymer of the nongrafted compatible polymer and a rubber polymer is called a compatible resin. In the compatible resin, the graft copolymer is present in an amount sufficient to provide the compatible resin with a Gardner Dart impact resistance of at least 100 in-lbs, preferably at least 160 in-lbs. Of the aforementioned compatible resins, the so-called ABS resins, particularly those that are mixtures of styrene/acrylonitrile copolymer with a graft copolymer of the same copolymer on a diene rubber are especially preferred. Examples of such especially preferred ABS resins are described in U.S. Pat. Nos. 3,660,535; 3,499,059 and 3,422,981.

In general, methods for preparing the compatible copolymer are not particularly critical since the desired improvement of physical properties of the blend imparted by the compatible copolymer is achieved regardless of the method for preparing said compatible copolymer. Accordingly, these copolymers can be prepared by known methods of radical polymerization, e.g., by bulk polymerization or polymerization in solution, suspension or emulsion polymerization or by a combined process such as precipitation and bulk/suspension processes. Examples of such nongrafted compatible polymers and such processes for preparing them are set forth in U.S. Pat. Nos. 3,660,525; 3,499,059 and 3,422,981. In instances wherein a compatible resin is to be employed in the preparation of the blend, the method of preparing the compatible resin is similarly not particularly critical. However, it is found that the most improvement in impact resistance is obtained when preformed rubber, preferably in the form of emulsion size particles, is dissolved or dispersed in a mixture of the monomeric component(s) of the nongrafted compatible polymer and thereafter heated to polymerize the monomers. Polymerization can be affected by heating this solution of rubber and monomer in mass, in emulsion, or while dispersed as droplets in an inert aqueous medium and at temperatures between 50° C. and 180° C. and pressures ranging from subatmospheric to superatmospheric. Although not required, it is sometimes desirable to employ a polymerization initiator such as a peroxygen compound or the like. The especially preferred compatible resins, i.e., the ABS resins, are prepared by conventional ABS polymerization methods, e.g., those described in U.S. Pat. Nos. 2,769,804; 3,168,593; 3,243,481; 3,426,103; 3,422,981; 3,499,059; 3,928,494 and 3,660,535 which are incorporated herein in their entirety.

In the preparation of the blend of the present invention, the aforementioned polymeric components are combined by conventional mixing techniques such as admixing granular or particulate polymeric components and subsequent malaxation of the components at temperatures sufficient to cause heat plastification thereof. Alternatively, the blends may be prepared by heat plastifying the higher melting polymeric components, i.e., the polycarbonate and the anhydride polymer, and then adding the other components thereto either in granular or heat plastified form. Generally, the order of mixing the blend components is not particularly critical.

One particularly convenient method for preparing the blend in accordance with the present invention is to dry blend a particulate of the polycarbonate with a particulate of the mixture of the remaining rubber component, anhydride copolymer and compatible polymer. This dry blend is directly fed into a heat fabricating apparatus such as a screw extruder or a reciprocating screw injection molding machine with sufficient mixing. While the particular manner of mixing these components in heat plastified form is not critical, sufficient mixing should be employed to insure a uniform distribution of each of the components throughout the resulted blend. In addition to the foregoing mixing procedures, other conventional mixing procedures may be employed including hot roll milling, kneeding and the like.

In addition to the aforementioned critical polymeric components, it is sometimes desirable to incorporate other additives into the blend. In this regard, such additives as stabilizers, lubricants, plasticizers, antioxidants, fire retardants, fillers, reinforcing fibers such as glass fibers, pigments and the like can be employed in the blends of this invention in a manner similar to the employment of such additives in conventional polycarbonate blends.

The following examples are given to illustrate the invention but should not be construed as limiting its scope. Unless otherwise indicated, all parts and percentages are by weight.

EXAMPLE 1

A 30-part portion of a particulate form of a homopolycarbonate of bisphenol-A is tumble blended with 15 parts of a particulate form of ABS resin (compatible resin) and 55 parts of rubber-modified styrene/maleic anhydride copolymer (anhydride resin) until an apparently uniform mixture is obtained. The resulting blend is then charged to a Welding Engineer's Twin Screw Extruder having a barrel temperature profile (feed-to-die) as follows: 400° F., 425° F., 450° F., 450° F. and 475° F. and extruded and granulated. Residence time of the blend in the extruder is ~30 seconds and the extruder is operated at 200 rpm. The resulting granules are injection molded at 475°–525° F. into tensile bars (16.26 cm $\times$ 1.27 cm $\times$ 0.3175 cm) and impact discs (5.08 cm dia $\times$ 0.32 cm). These discs and bars are tested for physical strength, impact resistance and heat resistance. The results of these tests are reported in Table I.

For purposes of further illustration of the invention, additional blends containing different amounts of the aforementioned polymeric components as well as blends containing other polymeric components are prepared and tested by the foregoing procedures. The results of these tests are also reported in Table I.

For purposes of comparison, binary blends (Sample Nos. $A_1$–$A_3$) outside the scope of this invention are prepared and tested by the foregoing procedure. The results of these tests are also reported in Table I. Also for comparison, control samples (Sample Nos. $C_1$–$C_3$) of the individual blend components are tested and reported in Table I.

TABLE I

| Sample No. | Polycarbonate(1) Type | Amt Pts | Anhydride Resin(2) Type | Amt Pts | Compatible Resin(3) Type | Amt Pts | Total Component(4), % PCO/SAN/SMA/R | Yield Tensile(5), psi | Elong % (6) | Izod(7) ft-lb/in | Dart(8) in-lb | DTUL (9) °F. | Injection Pressure(10), psi (fill time, sec) | Gloss (11) % |
|---|---|---|---|---|---|---|---|---|---|---|---|---|---|
| 1 | PCO(a) | 30 | HRP(a) | 55 | ABS(a) | 15 | 30/14/43/13 | 6200 | 54 | 4.7 | 200 | 244 | 6250 (2.1) | 13 |
| 2 | " | 40 | " | 45 | " | 15 | 40/14/35/11 | 6200 | 62 | 6.1 | >320 | 251 | 6250 (2.2) | 13 |
| 3 | " | 30 | SMA(b) | 32 | ABS(a) | 38 | 30/22.5/32.5/15 | 6620 | 9 | >10 | >320 | 243 | 6250 (2.2) | 95 |
| 4 | " | 40 | " | 32 | " | 28 | 40/17/32/11 | 7200 | 17 | >10 | >320 | 250 | 6563 (2.2) | 97 |
| 5 | " | 40 | " | 33 | ABS(c) | 27 | 40/12/33/15 | 8400 | 34 | 6.1 | >320 | 256 | 6250 (1.8) | 100+ |
| 6 | " | 40 | " | 35 | ABS(d) | 25 | 40/14/35/11 | 7500 | 17 | 10 | >320 | 255 | 6375 (1.8) | 95 |
| 7 | " | 50 | " | 27 | ABS(b) | 23 | 50/14/27/9 | 7500 | 111 | >10 | >320 | 255 | 5625 (2.3) | 100 |
| A₁* | PCO(b) | 50 | HRP(a) | | ABS(e) | 50 | 50/46/0/4 | 8500 | 108 | 8 | >320 | 242 | 6563 (3.9) | 100 |
| A₂* | PCO(a) | 30 | " | 70 | | | 30/55/15 | 5700 | 56 | 6 | >320 | 263 | 7250 (2.3) | 13 |
| A₃* | | | " | 50 | ABS(a) | 50 | 0/46/39/15 | 4500 | 44 | 2.1 | <20 | 222 | — | <30 |
| A₄* | PCO(a) | 40 | " | 60 | | | 40/0/47/13 | 6400 | 117 | 7 | >320 | 269 | 7500 (2.1) | 13 |
| C₁* | " | 100 | | | | | 100/0/0/0 | 9200 | 121 | >10 | >320 | 280 | NM | ND |
| C₂* | | | HRP(a) | 100 | | | 0/0/78/22 | 5000 | 34 | 2.3 | 40 | 260 | 7500 (2.2) | <30 |
| C₃* | | | | | ABS(a) | 100 | 0/92/0/8 | 3900 | 5.8 | 1.5 | 160 | 190 | 5625 (2.3) | 100 |

*Not an example of the invention.
(1)PCO(a) - homopolycarbonate of bisphenol-A having a $M_w$ as determined by gel permeation chromatography of 24,000–27,000.
PCO(b) - polycarbonate component of Cycoloy 800 sold by Borg-Warner.
(2)HRP(a) - styrene/maleic anhydride resin containing 22% diene rubber phase and 78% rigid phase wherein the rigid phase is a styrene/maleic anhydride (76%/24%) random copolymer having a $M_w$ of 165,000.
SMA(b) - styrene/maleic anhydride (79%/21%) random copolymer wherein a 10% solution of copolymer in methyl ethyl ketone has a viscosity of 5.8 cps and a $M_w$ of 172,000.
(3)ABS(a) - ABS resin containing 8% rubber phase and 92% of styrene/acrylonitrile (84%/16%) random copolymer having a $M_w$ (gel permeation chromatography using a polystyrene standard) of 200,000 wherein the rubber is a mass polymerized diene rubber.
ABS(b) - ABS resin containing 40% rubber phase and 60% of styrene/acrylonitrile (70%/30%) random copolymer having a $M_w$ of 73,000 wherein the diene rubber is an emulsion polymerized diene rubber (polydisperse).
ABS(c) - ABS resin containing 52.8% rubber phase and 48.2% of styrene/acrylonitrile (72%/28%) random copolymer having a $M_w$ of ~145,000 wherein the diene rubber is an emulsion polymerized diene rubber (monodisperse).
ABS(d) - ABS resin containing 45% rubber phase and 55% of styrene/acrylonitrile (72%/28%) random copolymer having a $M_w$ of 187,000 wherein the diene rubber is an emulsion polymerized diene rubber.
ABS(e) - ABS resin component of Cycoloy 800 sold by Borg-Warner.
(4)PCO/SAN/SMA/R - Blend content of total polycarbonate (PCO), total styrene/acrylonitrile copolymer (SAN), total styrene/maleic anhydride copolymer (SMA) and total rubber (R) as percent of the blend. Values for SAN, SMA and R include both grafted and nongrafted portions of each. For example, if a blend contains 10% ABS resin, 15% of which is rubber (grafted and nongrafted rubber), and contains 20% SMA resin (HRP), 10% of which is rubber (R) in blend is 3.5%, the total percent of SAN (grafted and nongrafted) is 8.5% and the total percent of SMA (grafted and nongrafted SMA) is 18%. The remaining 70% is polycarbonate.
(5)ASTM D-638
(6)ASTM D-638
(7)ASTM D-256
(8)Gardner Dart Impact Resistance Test using 3.63 kg drop weight and opening of 3.2 cm on a test bar having a thickness of 3.175 mm and a Dart of 1.59 cm with a radius of curvature of 0.795 cm.
(9)ASTM D-645 (unannealed at 66 psi).
(10)Injection pressure in pounds per square inch required to inject a 25 g sample of heat plastified blend into a mold within the fill time indicated. The temperature profile of injection molding machine is as follows: Rear zone (feed end of reciprocating screw section) = 470° F. ± 5° F., Front Zone (nozzle end of reciprocating screw section) = 490° F. ± 5° F., Nozzle = 480° F. ± 5° F., Mold = 200° F. ± 10° F. Polymer is injected at 300-500 psi below the flash pressure. Fill time is determined by measuring the time required for the polymer to flow between two pressure transducers wherein the first transducer is positioned in the conduit between the nozzle and the mold and the second transducer is located at the end of the mold opposite from the inlet end. The first transducer is activated and fill time begins when the pressure exerted thereon reaches 2000 psi. The second transducer is activated and fill time ends when the pressure thereon reaches 2000 psi. The dimensions of the mold are 16.26 cm × 1.27 cm × 0.3175 cm, the inside diameter of the conduit connecting the nozzle to the inlet end of the mold is 0.66 cm. The injection molding machine is a Newberry Injection Molding Machine (30 ton clamp/1 ounce barrel capacity) having a reciprocating screw. The gate opening (nozzle) into the mold is a rectangle (0.17 cm × 0.66 cm). The distance between the first and second transducers is 23.7 cm. NM for Sample No. C₁ means that the polycarbonate would not mold at the temperature used.
(11)ASTM D-523 (Gardner Gloss made at an angle of 60°).
ND—no molding was prepared.

As evidenced by the data of Table I, the blends of the present invention exhibit better processability (lower injection pressures and/or shorter fill times) than blends of polycarbonate and ABS resins or anhydride resin (HRP or SMA) which have equivalent impact resistance (Dart and Izod) and heat resistance (DTUL).

EXAMPLE 2

Following the procedure of Example 1, several blends are prepared by combining a homopolycarbonate of bisphenol-A with an ABS resin and different random styrene/maleic anhydride copolymers. The blends are tested and the results are reported in Table II.

TABLE II

| Sample No. | Blend Components | | | | | | Total Component(4), % PCO/SAN/SMA/R | Yield Tensile (5), psi | Elong % (6) | Izod(7) ft-lb/in | Dart(8) in-lb | DTUL (9) °F. | Gloss (11) % |
|---|---|---|---|---|---|---|---|---|---|---|---|---|---|
| | Polycarbonate(1) | | Anhydride Copolymer(2) | | Compatible Resin(3) | | | | | | | | |
| | Type | Amt Pts | Type | Amt Pts | Type | Amt Pts | | | | | | | |
| 1 | PCO(a) | 40 | SMA(b) | 32 | ABS(b) | 28 | 40/17/32/11 | 7090 | 29 | >10 | >320 | 244 | 100 |
| 2 | " | 40 | SMA(c) | 32 | " | 28 | 40/17/32/11 | 7200 | 17 | >10 | >320 | 250 | 97 |
| $A_1$* | " | 40 | SMA(d) | 32 | " | 28 | 40/17/32/11 | 7475 | 4 | 6 | <40 | 255 | 100 |
| $A_2$* | " | 40 | SMA(e) | 32 | " | 28 | 40/17/32/11 | 7165 | 9 | 1.3 | <20 | 247 | 97 |

*Not an example of the invention.
(1)Same as in Table I.
(2)SMA(a) - Styrene/maleic anhydride (67%/33%) copolymer - viscosity (10% solution of copolymer in methyl ethyl ketone) = 7.9 cps.
SMA(b) - Styrene/maleic anhydride (88%/12%) copolymer - viscosity (10% solution of copolymer in methyl ethyl ketone) = 5.3 cps.
SMA(c) - Styrene/maleic anhydride (79%/21%) copolymer - viscosity (10% solution of copolymer in methyl ethyl ketone) = 5.8 cps, $M_w$ = 172,000.
SMA(d) - Styrene/maleic anhydride (67%/33%) copolymer - viscosity (10% solution of copolymer in methyl ethyl ketone) = 2.5 cps.
SMA(e) - Styrene/maleic anhydride (82%/18%) copolymer - viscosity (10% solution of copolymer in methyl ethyl ketone) = 2.5 cps.
(3)–(9)Same as (3)–(9) in Table I.
(11)Same as in Table I.

As evidenced by the data of Table II, low molecular weight anhydride copolymers (viscosity of 10% polymer solution in methyl ethyl ketone less than 2.5 cps) have a deleterious effect on the Gardner Dart impact resistance of the blend.

EXAMPLE 3

Following the procedure of Example 1, several blends are prepared by combining a homopolycarbonate of bisphenol A with different compatible resins and a random styrene/maleic anhydride copolymer. The blends are tested and the results are recorded in Table III.

TABLE III

| Sample No. | Polycarbonate(1) Type | Polycarbonate(1) Amt Pts | SMA Co-polymer(2) Type | SMA Co-polymer(2) Amt Pts | Compatible Resin(3) Type | Compatible Resin(3) Amt Pts | Total Component(4), % PCO/CP/SMA/R | Yield Tensile (5), psi | Elong % (6) | Izod(7) ft-lb/in | Dart(8) in-lb | DTUL (9) °F. | Injection Pressure(10), psi (fill time, sec) | Gloss (11) % |
|---|---|---|---|---|---|---|---|---|---|---|---|---|---|---|
| 1 | PCO(a) | 40 | SMA(b) | 30 | ABS(g) | 30 | 40/19/30/11 | 8300 | 38 | >10 | >320 | 256 | 6250 (1.7) | 100 |
| 2 | " | 40 | " | 32 | BAR(h) | 28 | 40/17/32/11 | 8100 | 9 | 5.2 | >320 | 253 | 5000 (2.4) | 88 |
| 3 | " | 40 | " | 25 | SAM(i) | 35 | 40/28/25/7 | 8500 | 13 | 5.4 | >320 | 242 | 6312 (2.2) | 98 |
| 4 | " | 40 | " | 32 | ABS(b) | 38 | 30/23/32/15 | 6620 | 9 | >10 | >320 | 243 | 6250 (2.2) | 95 |
| 5 | " | 40 | " | 31 | ABS(j) | 29 | 40/19/31/10 | 7700 | 10 | 3.6 | 240 | 246 | 6250 (1.7) | 33 |
| 6 | " | 40 | HRP(a) | 32 | ABS(k) | 28 | 40/26/25/9 | 7500 | 100 | >10 | >320 | 246 | 5900 (2.7) | 50 |
| 7 | " | 40 | " | 30 | PMA(m) | 30 | 40/30/23/7 | 8000 | 63 | 4 | >320 | 252 | 6250 (2.9) | 40 |
| 8 | " | 40 | " | 30 | SAN(n) | 30 | 40/30/23/7 | 7800 | 35 | 6 | >320 | 245 | 5600 (2.6) | 45 |
| A₁* | " | 40 | SMA(b) | 45 | SB(l) | 15 | 40/0/45/15 | 6200 | 4 | 1.4 | <20 | 260 | 5000 (2.9) | 55 |
| A₂* | " | 40 | HRP(a) | 32 | HIPS(o) | 28 | 40/26**/25/9 | 5900 | 69 | 1 | 120 | 252 | 5300 (2.2) | 30 |
| A₃* | " | 40 | " | 30 | GPPS(p) | 30 | 40/30**/23/7 | 7300 | 47 | 1 | 40 | 250 | 5600 (2.1) | 41 |

*Not an example of the invention.
**Polystyrene is not a compatible polymer.
(1)PCO(a) - same as in Table I.
(2)HRP(a) - same as in Table I.
SMA(b) - same as in Table I.
(3)ABS(b) - same as in Table I.
ABS(g) - Blend of three ABS resins wherein (1) the blend contains 36.6% diene rubber phase and 63.4% of styrene/acrylonitrile random copolymer phase, (2) the styrene/acrylonitrile random copolymers contain from about 16 to about 30 weight percent of copolymerized acrylonitrile and have a M_w of 100,000-250,000 and (3) the rubber components are in the form of both colloidal size particles and larger particles having diameters up to 5 micrometers.
BAR(h) - Butyl acrylate emulsion rubber grafted with styrene/acrylonitrile random copolymer (40% rubber phase in form of 1800 Angstrom particles) wherein the styrene/acrylonitrile copolymer has a M_w of 180,000.
SAM(i) - Resin containing 25% diene rubber phase (a portion of which is grafted with styrene/acrylonitrile/methyl methacrylate terpolymer) and 75% of styrene/acrylonitrile/methacrylate random terpolymer.
ABS(j) - ABS resin containing 35% diene rubber phase and 65% of styrene/acrylonitrile random copolymer having a M_w of 130,000.
SB(l) - Styrene/butadiene block copolymer rubber (Kraton® 2103 sold by Shell Chemical).
ABS(k) - ABS resin containing 7% diene rubber phase and 93% styrene/acrylonitrile (72%/28%) random copolymer having a M_w of 150,000-200,000.
PMA(m) - Poly(methyl methacrylate) (Lucite® 140 sold by duPont).
SAN(n) - Styrene/acrylonitrile (75%/25%) random copolymer having a M_w of 155,000.
HIPS(o) - Rubber-modified polystyrene containing 8% diene rubber phase and 92% polystyrene having a M_w of 200,000-300,000. 3000,000.
GPPS(p) - Polystyrene having a M_w of 300,000.
(4)Same as in Table I except that CP means Compatible Polymer.
(5) through (11) - same as (5) through (11) in Table I.

As evidenced by the data set forth in Table III, blends (Sample Nos. 1–8) containing a compatible polymer and rubber grafted with anhydride copolymer and/or compatible polymer exhibit substantially greater impact resistance (Izod and Dart) than blends (Sample Nos. $A_1$–$A_3$) containing polycarbonate, anhydride copolymer and rubber polymer but no compatible polymer.

What is claimed is:

1. A heterogeneous blend comprising the following components: (1) a polycarbonate of a dihydric phenol blended with (2) a rubber component, (3) an anhydride copolymer of a monovinylidene aromatic monomer and an $\alpha,\beta$-ethylenically unsaturated anhydride and (4) a compatible polymer of a polar monomer other than an anhydride; said rubber component containing a copolymer of a rubber polymer blocked or grafted with a portion of the anhydride copolymer and/or the polymer of the polar monomer wherein said block or graft copolymer is presentt in an amount sufficient to measurably increase the impact resistance of the blend, said polar monomer being a polymerizable ethylenically unsaturated organic compound which bears a polar group having a group moment in the range from about 1.4 to about 4 Debye units determined in accordance with Smyth, C. P., *Dielectric Behavior and Structure*, McGraw-Hill Book Company, Inc., New York (1955), said components being present in proportions such that the blend has (a) a Gardner Dart impact strength of at least about 160 inch-pounds, (b) a notched Izod impact strength of at least about 3 foot-pounds/inch of notch, (c) a heat resistance of at least about 240° F. as determined by ASTM D-648 (unannealed at 66 pounds per square inch) and (d) a processability (injection pressure) less than about 6600 pounds per square inch at a mold fill time of 2.5 seconds as determined by the test procedure for Injection Pressure set forth in footnote (10) of Table I hereof.

2. The blend of claim 1 wherein the dihydric phenol is a bis(hydroxyphenyl)alkylidene, the anhydride copolymer is a styrene/maleic anhydride copolymer, the compatible polymer is a polymer of an ethylenically unsaturated nitrile, an ethylenically unsaturated carboxylic acid or an alkyl ester of an ethylenically unsaturated carboxylic acid, the rubber component is a diene rubber polymer or a butyl acrylate rubber polymer wherein a portion of said rubber polymer is grafted with a portion of the anhydride copolymer and/or the compatible polymer.

3. The blend of claim 2 which consists essentially of from about 25 to about 80 weight percent of the polycarbonate, from about 10 to about 62 weight percent of the anhydride copolymer, from about 2 to about 50 weight percent of the compatible copolymer and from about 5 to about 25 weight percent of the rubber polymer.

4. The blend of claim 3 wherein the polycarbonate is a homopolycarbonate of bisphenol-A, the compatible copolymer is a styrene/acrylonitrile copolymer and the rubber polymer is a polymer of butadiene wherein a portion of the rubber polymer is grafted with a portion of the styrene/acrylonitrile copolymer.

5. The blend of claim 3 wherein the rubber polymer is a polymer of butadiene wherein a portion of the rubber polymer is grafted with a portion of the anhydride copolymer.

6. The blend of claim 1 which contains a methyl methacrylate polymer in addition to the four components of claim 1.

* * * * *

UNITED STATES PATENT AND TRADEMARK OFFICE
CERTIFICATE OF CORRECTION

PATENT NO. : 4,367,310
DATED : January 4, 1983
INVENTOR(S) : David E. Henton

It is certified that error appears in the above—identified patent and that said Letters Patent is hereby corrected as shown below:

Column 1, line 25, "polycarbontes" should read -- polycarbonates --.

Column 1, lines 35 and 36, "polycarbontes" should read -- polycarbonates --.

Column 2, line 23, "Applictions" should read -- Applications --.

Column 4, line 4, "copolymes" should read -- copolymers --.

Column 7, line 19, "3,660,525" should read -- 3,660,535 --.

Column 9, Table I, column 6 under the heading "Type", item 3, "ABS(a)" should read -- ABS(b) --.

UNITED STATES PATENT AND TRADEMARK OFFICE
CERTIFICATE OF CORRECTION

PATENT NO. : 4,367,310

DATED : January 4, 1983

INVENTOR(S) : David E. Henton

It is certified that error appears in the above—identified patent and that said Letters Patent is hereby corrected as shown below:

Column 14, item 8 under the footnotes of Table III, the definition of BAR(h), "Butyl acrylate emulsion rubber grafted with styrene/acrylonitrile random copolymer (40% rubber phase in form of 1800 Angstrom particles) wherein the styrene/acrylonitrile copolymer has a $M_w$ of 180,000." should read --Butyl acrylate emulsion rubber grafted with styrene/acrylonitrile random copolymer (40% rubber phase in form of 1800 Angstrom particles) wherein the styrene/acrylonitrile random copolymer has a $M_w$ of 180,000. --

Column 14, item 9 under the footnotes of Table III, the definition of SAM(i), "Resin containing 25% diene rubber phase (a portion of which is grafted with styrene/acrylonitrile/methyl methacrylate terpolymer) and 75% of styrene/acrylonitrile/methacrylate random terpolymer." should read -- Resin containing 25% diene rubber phase (a portion of which is grafted with styrene/acrylonitrile/methyl methacrylate terpolymer) and 75% of styrene/acrylonitrile/methyl methacrylate random terpolymer. --

UNITED STATES PATENT AND TRADEMARK OFFICE
CERTIFICATE OF CORRECTION

PATENT NO. : 4,367,310

DATED : January 4, 1983

INVENTOR(S) : David E. Henton

It is certified that error appears in the above—identified patent and that said Letters Patent is hereby corrected as shown below:

Column 14, item 15 under the footnotes of Table III, the definition of HIPS(o), "Rubber-modified polystyrene containing 8% diene rubber phase and 92% polystyrene having a $M_w$ 200,000-300,000 3000,000." should read -- Rubber-modified polystyrene containing 8% diene rubber phase and 92% polystyrene having a $M_w$ of 200,000-300,000. --

Column 15, line 19, "presentt" should read -- present --.

Signed and Sealed this

Seventh Day of February 1984

[SEAL]

Attest:

GERALD J. MOSSINGHOFF

Attesting Officer

Commissioner of Patents and Trademarks

REEXAMINATION CERTIFICATE (613th)
United States Patent [19]
Henton

[11] B1 4,367,310

[45] Certificate Issued Dec. 30, 1986

[54] BLENDS OF POLYCARBONATE WITH RUBBER AND MONOVINYLIDENE AROMATIC COPOLYMERS

[75] Inventor: David E. Henton, Midland, Mich.

[73] Assignee: The Dow Chemical Company, Midland, Mich.

Reexamination Request:
No. 90/000,901, Nov. 1, 1985

Reexamination Certificate for:
Patent No.: 4,367,310
Issued: Jan. 4, 1983
Appl. No.: 149,821
Filed: May 15, 1980

Certificate of Correction issued Feb. 7, 1984.

Related U.S. Application Data

[63] Continuation-in-part of Ser. No. 35,584, May 3, 1979, Pat. No. 4,218,544.

[51] Int. Cl.$^4$ .............. C08L 55/04; C08L 35/06; C08L 69/00; C08L 9/00
[52] U.S. Cl. ............................. 525/67; 525/71; 525/74; 525/84; 525/92; 525/93; 525/94; 525/148; 525/146
[58] Field of Search .......................... 525/67

[56] References Cited

U.S. PATENT DOCUMENTS 4,205,140  5/1980  Liebig et al. .................. 525/67
4,205,141  5/1980  Liebig et al. .................. 525/67

FOREIGN PATENT DOCUMENTS 54-50553  4/1979  Japan .
1452141  10/1976  United Kingdom .

*Primary Examiner*—Wilbert J. Briggs

[57] ABSTRACT

Blends of polycarbonate, such as a polycarbonate of bisphenol-A, with (1) a grafted and nongrafted rubber, such as a diene rubber and a diene rubber grafted with a polar polymer, (2) a monovinylidene aromatic/carboxylic anhydride copolymer, such as styrene/maleic anhydride copolymer, and (3) a compatible polymer, such as styrene/acrylonitrile copolymer, exhibit improved impact strength, melt flow properties and heat resistance. Such blends are particularly useful in the manufacture of molded parts which must be exposed to high temperature during manufacture and use.

An example of a particularly desirable blend is a blend of a homopolycarbonate of bisphenol-A with styrene/maleic anhydride copolymer and an ABS resin containing grafted and nongrafted butadiene rubber and styrene/acrylonitrile random copolymer.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-6, dependent on an amended claim, are determined to be patentable.

New claims 7-11 are added and determined to be patentable.

1. A heterogeneous blend comprising the following components: (1) a polycarbonate of a dihydric phenol blended with (2) a rubber component, (3) an anhydride copolymer of a monovinylidene aromatic monomer and an α,β-ethylenically unsaturated anhydride and (4) a compatible polymer of a polar monomer other than an anhydride; said rubber component containing a copolymer of a rubber polymer blocked or grafted with a portion of the anhydride copolymer and/or the polymer of the polar monomer wherein said block or graft copolymer is presentt in an amount sufficient to measurably increase the impact resistance of the blend, said polar monomer being a polymerizable ethylenically unsaturated organic compound which bears a polar group having a group moment in the range from about 1.4 to about 4 Debye units determined in accordance with Smyth, C. P., Dielectric Behavior and Structure, McGraw-Hill Book Company, Inc., New York (1955), said components being present in proportions such that the blend has (a) a Gardner Dart impact strength of at least about 160 inch-pounds, (b) a notched Izod impact strength of at least about 3 foot-pounds/inch of notch, (c) a heat resistance of at least about 240° F. as determined by ASTM D-648 (unannealed at 66 pounds per square inch) and (d) a processability (injection pressure) less than about 6600 pounds per square inch at a mold fill time of 2.5 seconds as determined by the test procedure for Injection Pressure set forth in footnote (10) of Table I hereof, *provided further that the anhydride copolymer additionally contains significantly less than 5 weight percent, if any, of an α,β-unsaturated nitrile comonomer.*

*7. A polymer blend according to claim 1, wherein the compatible polymer is a polymer of an alkylester of an α,β-ethylenically unsaturated acid.*

*8. A polymer blend according to claim 7, wherein the compatible polymer is a polymer of methylmethacrylate.*

*9. A polymer blend according to claim 8, wherein the compatible polymer contains nongrafted compatible polymer and graft copolymer.*

*10. A polymer blend according to claim 9, wherein the rubber component comprises polybutadiene or a copolymer of butadiene with styrene.*

*11. A polymer blend according to claim 9, wherein the graft copolymer comprises grafted polybutadiene or a grafted copolymer of butadiene and styrene.*

* * * * *